United States Patent
Paudyal et al.

(10) Patent No.: US 11,641,274 B2
(45) Date of Patent: May 2, 2023

(54) SYSTEMS AND METHODS FOR MANIPULATION OF PRIVATE INFORMATION ON UNTRUSTED ENVIRONMENTS

(71) Applicant: JPMorgan Chase Bank, N.A., New York, NY (US)

(72) Inventors: Pramila Paudyal, Wilmington, DE (US); Michael J. Strong, Mount Vernon, OH (US); Jim Lovett, Thonotosassa, FL (US); Guillaume Jean-Philippe Humbert, Singapore (SG); John D. Killmer, Downingtown, PA (US); Vincent Feingold, Haledon, NJ (US); Ravikumar V. Barot, Streamwood, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 241 days.

(21) Appl. No.: 16/361,324

(22) Filed: Mar. 22, 2019

(65) Prior Publication Data

US 2020/0304295 A1  Sep. 24, 2020

(51) Int. Cl.
*H04L 9/08* (2006.01)
*H04L 9/06* (2006.01)
(Continued)

(52) U.S. Cl.
CPC ............ *H04L 9/088* (2013.01); *G06F 21/602* (2013.01); *G06F 21/6245* (2013.01); *H04L 9/0643* (2013.01)

(58) Field of Classification Search
CPC ... H04L 9/088; H04L 9/0643; H04L 63/0428; H04L 63/08; H04L 9/0894; H04L 9/3242;
(Continued)

(56) References Cited

U.S. PATENT DOCUMENTS 5,828,832 A * 10/1998 Holden ............... H04L 63/0823
709/229
6,049,612 A    4/2000 Fielder et al.
(Continued)

FOREIGN PATENT DOCUMENTS

JP          11239238 A  *  8/1999
JP       2006099697 A  *  4/2006

OTHER PUBLICATIONS

Notification of Transmittal of the International Search Report and the Written Opinion of the International Searching in PCT/US20/24126 dated Jun. 26, 2020.
(Continued)

*Primary Examiner* — Shahriar Zarrineh
(74) *Attorney, Agent, or Firm* — Greenblum & Bernstein P.L.C.

(57) ABSTRACT

Systems and methods for manipulation of private information in untrusted environments are disclosed. In one embodiment, in a trusted computing environment comprising at least one computer processor, for a plurality of data records, a method for manipulation of private information in untrusted environments may include: (1) separating each data record into a confidential data attribute and a non-confidential data attribute; (3) calculating an encrypted value for the confidential data attribute using an encryption key; (4) calculating an authentication value for the confidential data attribute using a hash value key; (5) associating the encrypted value and the authentication value in a protected data set; and (6) associating the non-confidential data record with the associated encrypted value and the authentication value; and (7) exporting the protected data set to an untrusted computing environment.

15 Claims, 5 Drawing Sheets

(51) Int. Cl.
   *G06F 21/62* (2013.01)
   *G06F 21/60* (2013.01)

(58) Field of Classification Search
   CPC ............... G06F 21/602; G06F 21/6245; G06F 21/6218; G06F 21/53
   USPC ........................................................ 713/171
   See application file for complete search history.

(56) References Cited

U.S. PATENT DOCUMENTS

| | | | |
|---|---|---|---|
| 6,763,460 B1* | 7/2004 | Hild | H04L 67/2823 713/161 |
| 7,516,321 B2* | 4/2009 | Chen | H04L 9/3073 380/259 |
| 7,711,550 B1* | 5/2010 | Feinberg | G06F 40/295 704/10 |
| 7,787,609 B1* | 8/2010 | Flockhart | H04M 3/5233 379/265.11 |
| 7,813,512 B2* | 10/2010 | Futa | H04L 9/0844 713/169 |
| 8,127,145 B2* | 2/2012 | O'Brien | G06F 21/6218 713/189 |
| 8,448,250 B2* | 5/2013 | Mohnl | H04K 1/02 713/160 |
| 8,938,067 B2 | 1/2015 | Martin et al. | |
| 9,083,526 B2 | 7/2015 | Gentry | |
| 9,935,977 B1* | 4/2018 | Tribble | H04L 63/12 |
| 10,073,981 B2* | 9/2018 | Arasu | G06F 21/62 |
| 10,079,683 B1* | 9/2018 | Chebaro | H04L 63/18 |
| 10,374,807 B2* | 8/2019 | Chen | H04L 9/3242 |
| 10,521,610 B1* | 12/2019 | Ledet | H04L 9/3226 |
| 10,635,657 B1* | 4/2020 | Prakash | G06F 16/212 |
| 10,700,865 B1* | 6/2020 | Hendrick | H04L 9/32 |
| 10,990,693 B1* | 4/2021 | Newman | G06F 21/6227 |
| 2001/0012114 A1* | 8/2001 | Ozaki | H04N 1/4413 358/1.12 |
| 2001/0044886 A1* | 11/2001 | Cassagnol | G06F 21/6245 711/163 |
| 2003/0097583 A1* | 5/2003 | Lacan | G06F 21/6245 726/6 |
| 2004/0013266 A1* | 1/2004 | Giraud | G07F 7/1008 380/1 |
| 2005/0005121 A1* | 1/2005 | Chen | H04L 9/083 713/171 |
| 2005/0091524 A1* | 4/2005 | Abe | G06Q 20/341 726/26 |
| 2005/0197177 A1* | 9/2005 | Charasika | B41L 1/22 462/28 |
| 2005/0209884 A1* | 9/2005 | Gil | G16H 40/67 705/2 |
| 2005/0251865 A1* | 11/2005 | Mont | H04L 9/3073 726/26 |
| 2006/0005067 A1* | 1/2006 | Llyod | G06F 11/36 714/4.1 |
| 2006/0224661 A1* | 10/2006 | Aono | G05B 19/0423 709/201 |
| 2007/0033398 A1* | 2/2007 | Robertson | G07F 7/1008 713/168 |
| 2007/0043940 A1* | 2/2007 | Gustave | H04W 12/037 713/150 |
| 2007/0271608 A1* | 11/2007 | Shimizu | G06F 3/0482 726/17 |
| 2008/0140577 A1* | 6/2008 | Rahman | G06Q 20/3829 705/71 |
| 2008/0184374 A1* | 7/2008 | Mohnl | H04K 1/02 726/26 |
| 2008/0301445 A1 | 12/2008 | Vasic et al. | |
| 2009/0022321 A1* | 1/2009 | Saito | G06F 16/284 380/278 |
| 2009/0055354 A1* | 2/2009 | Arad | G06F 16/951 |
| 2009/0067079 A1* | 3/2009 | Al-Azzawi | G06F 21/74 |
| 2009/0075630 A1* | 3/2009 | McLean | H04L 63/0428 455/410 |
| 2009/0119221 A1* | 5/2009 | Weston | G07F 7/1008 705/76 |
| 2009/0216831 A1* | 8/2009 | Buckner | G06Q 20/4014 709/202 |
| 2010/0077489 A1* | 3/2010 | Ake | G06F 21/6245 726/30 |
| 2010/0185862 A1* | 7/2010 | Moore | H04L 9/08 713/171 |
| 2011/0010195 A1* | 1/2011 | Cohn | G16H 10/60 705/3 |
| 2011/0191588 A1* | 8/2011 | Rogaway | H04L 9/0637 713/170 |
| 2013/0031074 A1* | 1/2013 | Vartanian | G06F 16/9535 707/706 |
| 2013/0103943 A1* | 4/2013 | Hirsch | G09G 3/20 713/168 |
| 2013/0163764 A1* | 6/2013 | van den Berg | H04L 9/0822 380/278 |
| 2013/0268775 A1* | 10/2013 | Hawkins | G06F 21/602 713/189 |
| 2013/0301830 A1* | 11/2013 | Bar-El | H04L 63/0823 380/210 |
| 2014/0006436 A1* | 1/2014 | Bonfiglio | G06Q 10/02 707/758 |
| 2014/0019756 A1* | 1/2014 | Krajec | G06F 21/52 713/167 |
| 2014/0020068 A1* | 1/2014 | Desai | G06Q 20/40 726/4 |
| 2014/0090087 A1* | 3/2014 | Ichijo | H04W 4/024 726/28 |
| 2014/0108045 A1* | 4/2014 | Afshar | G16H 50/20 705/3 |
| 2014/0108108 A1* | 4/2014 | Artman | G06Q 20/32 705/14.1 |
| 2014/0188921 A1* | 7/2014 | Thomason | G06F 40/289 707/758 |
| 2014/0258243 A1* | 9/2014 | Bell | H04L 67/306 707/690 |
| 2014/0289833 A1* | 9/2014 | Briceno | H04L 63/08 726/7 |
| 2014/0331338 A1* | 11/2014 | Serita | G06F 21/6227 726/30 |
| 2015/0089589 A1* | 3/2015 | Cucinotta | G06F 21/74 726/3 |
| 2015/0112702 A1* | 4/2015 | Joao | G16H 10/60 705/2 |
| 2015/0134969 A1* | 5/2015 | Kim | H04L 9/3242 713/176 |
| 2015/0149208 A1* | 5/2015 | Lynch | G16H 10/60 705/3 |
| 2015/0229613 A1* | 8/2015 | Baum | G06F 16/00 713/171 |
| 2015/0261916 A1* | 9/2015 | Robinson | G16H 10/60 705/3 |
| 2015/0310188 A1* | 10/2015 | Ford | H04L 63/0428 726/28 |
| 2015/0350186 A1* | 12/2015 | Chan | H04L 63/0807 726/9 |
| 2016/0021533 A1* | 1/2016 | Kimpe | G06F 21/6245 455/411 |
| 2016/0110500 A1 | 4/2016 | Wang et al. | |
| 2016/0188909 A1* | 6/2016 | Zatko | G06F 21/31 726/26 |
| 2016/0205074 A1* | 7/2016 | Mitchell | H04L 9/3247 713/171 |
| 2016/0284038 A1* | 9/2016 | Johnson | G16H 50/00 |
| 2016/0342812 A1* | 11/2016 | Lynch | G06F 21/6254 |
| 2016/0364559 A1* | 12/2016 | Bali | H04L 9/3239 |
| 2017/0161439 A1* | 6/2017 | Raduchel | H04W 12/06 |
| 2017/0177890 A1* | 6/2017 | Fink | G06F 7/588 |
| 2017/0293772 A1* | 10/2017 | Chen | H04L 63/0407 |
| 2017/0293913 A1* | 10/2017 | Gulak | G16H 10/60 |
| 2018/0082074 A1* | 3/2018 | Nunes | G06F 21/608 |
| 2018/0091306 A1* | 3/2018 | Antonopoulos | G06F 21/57 |

(56) References Cited

U.S. PATENT DOCUMENTS

| | | | | |
|---|---|---|---|---|
| 2018/0114196 | A1* | 4/2018 | Demaio | G16H 10/60 |
| 2018/0219841 | A1* | 8/2018 | Nadler | H04L 9/0637 |
| 2018/0262481 | A1* | 9/2018 | Doi | H04L 9/0866 |
| 2018/0330052 | A1* | 11/2018 | Barrus | G16B 50/40 |
| 2018/0349627 | A1* | 12/2018 | Kaushik | H04L 9/0643 |
| 2018/0373885 | A1* | 12/2018 | Arad | G06F 21/629 |
| 2019/0036688 | A1* | 1/2019 | Wasily | H04L 63/0823 |
| 2019/0140846 | A1* | 5/2019 | Moore | H04L 9/3265 |
| 2019/0164156 | A1* | 5/2019 | Lindemann | H04L 9/0894 |
| 2019/0229890 | A1* | 7/2019 | Brehmer | H04L 9/0637 |
| 2019/0260592 | A1* | 8/2019 | Nguyen | G06Q 10/0833 |
| 2019/0266355 | A1* | 8/2019 | Lockhart, III | H04L 63/1433 |
| 2019/0334874 | A1* | 10/2019 | Frost | H04L 63/0272 |
| 2019/0392176 | A1* | 12/2019 | Taron | G06F 3/167 |
| 2020/0076777 | A1* | 3/2020 | Sipcic | H04L 9/088 |
| 2020/0089917 | A1* | 3/2020 | Skourtis | H04L 9/008 |
| 2020/0202038 | A1* | 6/2020 | Zhang | G16H 50/30 |
| 2022/0138286 | A1* | 5/2022 | Zage | G06F 21/602 |
| | | | | 726/26 |

OTHER PUBLICATIONS

International Bureau, International Preliminary Examination Report on Patentability, International Application No. PCT/US2020/024126, dated Oct. 7, 2021, pp. 1-6.

\* cited by examiner

| ID | Name | AddressName | CityName | StateName | ZIPCode | SpokenLanguage |
|---|---|---|---|---|---|---|
| 1 | Mike Smith | 54 Elm St | Wayne | NJ | 08605 | Spanish |
| 2 | Mike Smith | 54 Elm St | Wayne | NJ | 08605 | German |
| 3 | Mike Smith | 54 Elm St | Wayne | NJ | 08605 | Italian |
| 4 | John Brown | 738 Vally Rd | Wayne | NJ | 08605 | French |
| 5 | Bekky Fischer | 396 Elm St | Red Hook | NY | 10307 | German |
| 6 | Bekky Fischer | 396 Elm St | Red Hook | NY | 10307 | French |
| 7 | Lory Smith | 101 Elm St | Wayne | NY | 10307 | German |
| 8 | Lory Smith | 101 Elm St | Wayne | NY | 10307 | French |
| 9 | Helen Smith | 396 Heights Dr | Red Hook | NY | 10307 | Italian |
| 10 | Helen Smith | 396 Heights Dr | Red Hook | NY | 10307 | French |
| 11 | Helen Smith | 396 Heights Dr | Red Hook | NY | 10307 | Spanish |
| 12 | Helen Brown | 101 Park Av | Green Brook | UT | 84047 | French |
| 13 | Helen Brown | 101 Park Av | Green Brook | UT | 84047 | Italian |
| 14 | Helen Miller | 54 Main St | Stanhope | UT | 84047 | Spanish |
| 15 | Helen Miller | 54 Main St | Stanhope | UT | 84047 | Italian |
| 16 | Paul Brown | 314 Skyline Dr | Stanhope | UT | 84047 | German |
| 17 | Paul Brown | 314 Skyline Dr | Stanhope | UT | 84047 | Spanish |
| 18 | Paul Brown | 314 Skyline Dr | Stanhope | UT | 84047 | French |
| 19 | John Miller | 54 Vally Rd | Red Hook | NY | 10307 | Italian |
| 20 | John Miller | 54 Vally Rd | Red Hook | NY | 10307 | French |
| 21 | Helen Jones | 314 Elm St | Green Brook | UT | 84047 | French |
| 22 | Paul Fischer | 402 Elm St | Stanhope | NJ | 08605 | Italian |
| 23 | Paul Fischer | 402 Elm St | Stanhope | NJ | 08605 | French |
| 24 | Paul Fischer | 402 Elm St | Stanhope | NJ | 08605 | German |
| 25 | Mary Brown | 314 Skyline Dr | Stanhope | NY | 10307 | French |
| 26 | Mary Brown | 314 Skyline Dr | Stanhope | NY | 10307 | German |
| 27 | Mary Brown | 101 Main St | Wayne | NY | 10307 | Italian |
| 28 | Mary Brown | 101 Main St | Wayne | NY | 10307 | German |
| 29 | Mary Carson | 314 Main St | Red Hook | NY | 10307 | French |
| 30 | Mary Carson | 314 Main St | Red Hook | NY | 10307 | Italian |
| 31 | Jane Miller | 738 Elm St | Bluffdale | UT | 84047 | Spanish |
| 32 | Ann Fischer | 314 Elm St | Stanhope | UT | 84047 | French |
| 33 | Ann Fischer | 314 Elm St | Stanhope | UT | 84047 | Italian |
| 34 | Ann Fischer | 314 Elm St | Stanhope | UT | 84047 | Spanish |
| 35 | Paul Jones | 314 Heights Dr | Red Hook | NJ | 08605 | German |
| 36 | Paul Jones | 314 Heights Dr | Red Hook | NJ | 08605 | Spanish |
| 37 | Mike Fischer | 738 Vally Rd | Stanhope | NY | 10307 | French |
| 38 | Ann Miller | 101 Park Av | Red Hook | NJ | 08605 | French |
| 39 | Ann Carson | 396 Heights Dr | Bluffdale | NY | 10307 | Italian |
| 40 | Ann Carson | 396 Heights Dr | Bluffdale | NY | 10307 | Spanish |

FIGURE 3

| NameHash | NameCiperText | AddressHash | AddressCiperText | CityName | StateName | ZIPCode | SpokenLanguage | nID |
|---|---|---|---|---|---|---|---|---|
| 5435c65ed3 | 8e9561df70 | 0801ba634e | 2284008bd | Wayne | NY | 10307 | German | 28 |
| 5435c65ed3 | d174ff3d1f | 0801ba634e | 7100eceee34 | Wayne | NY | 10307 | Italian | 27 |
| d6e42f392a | 0f1b7b80d1 | 2086935952 | 2cfea3179d | Red Hook | NY | 10307 | French | 6 |
| d6e42f392a | 9a4e7c5ff4 | 2086935952 | 8280844c705 | Red Hook | NY | 10307 | German | 5 |
| 5435c65ed3 | 773073a99 | 42aa441a72 | a6f4298610 | Red Hook | NY | 10307 | Italian | 30 |
| 5435c65ed3 | 756747f75 | 42aa441a72 | b252273266 | Red Hook | NY | 10307 | French | 29 |
| 3fe888999f | a643c995a | 5a26801db6 | 043cea8761 | Red Hook | NY | 10307 | Spanish | 11 |
| 5b70c52288 | 379f2f5898 | 5a26801db6 | 399ecb6edf | Bluffdale | NY | 10307 | Italian | 39 |
| 3fe888999f | 4001106d7 | 5a26801db6 | 572cbee003 | Red Hook | NY | 10307 | Italian | 9 |
| 3fe888999f | 543d1d6d4 | 5a26801db6 | 83ac8efed | Red Hook | NY | 10307 | French | 10 |
| 5b70c52288 | 244b64c50 | 5a26801db6 | 9911b60a3c | Bluffdale | NY | 10307 | Spanish | 40 |
| 5435c65ed3 | 30d85f03c8 | 69b6220bbb | 6304fe20e3 | Stanhope | NY | 10307 | French | 25 |
| 5435c65ed3 | 4fe176f44 | 69b6220bbb | ce372a1adb | Stanhope | NY | 10307 | German | 26 |
| 2265bdb729 | 75f24730a1 | a0424d1b5c | 9402a80b25 | Stanhope | NY | 10307 | French | 37 |
| 8e544adecd | 00f1d19e5b | b3206b0238 | 8cec24700b | Wayne | NY | 10307 | German | 7 |
| 6e344adecd | 2ae1b5d171 | b3206b0238 | d623cbe81e | Wayne | NY | 10307 | French | 8 |
| bacb7fd521 | 793c6f3591 | fd47c02c7d | 56ed50fec9 | Red Hook | NY | 10307 | Italian | 19 |
| bacb7fd521 | f404c81f62 | fd47c02c7d | 7949aa8a8e | Red Hook | NY | 10307 | French | 20 |

FIGURE 4

| AddressHash | AddressCiperText | CityName | StateName | SpokenLanguages |
|---|---|---|---|---|
| 07045c2aae | 1c6522119b | Stanhope | NJ | 3 |
| 0801ba634e | 22840084bd | Wayne | NY | 2 |
| 2d86935952 | 2cfea3179d | Red Hook | NY | 2 |
| 42aa441a72 | a6f429861b | Red Hook | NY | 2 |
| 4e8bb04a9d | 9a5acdff75 | Stanhope | UT | 2 |
| 5a26801db6 | 399eeb6e0f | Bluffdale | NY | 2 |
| 5a26801db6 | 043cea8761 | Red Hook | NY | 3 |
| 60f438b330 | 830d8e33da | Bluffdale | UT | 1 |
| 69b6220bbb | 63046e20e3 | Stanhope | NY | 2 |
| 69b6220bbb | 543435db89 | Stanhope | UT | 3 |
| a0424d1b5c | 9482ad0b25 | Stanhope | NY | 1 |
| a0424d1b5c | b639d671a1 | Wayne | NJ | 1 |
| ab1eba894f | ecd39fbfe9 | Green Brook | UT | 1 |
| ab1eba894f | 354760caa1 | Stanhope | UT | 3 |
| ac480bcfa8 | bb8f7f82f9 | Red Hook | NJ | 2 |
| b320600238 | 8cae24700b | Wayne | NY | 2 |
| b73e3c5716 | 20d2cc3e6b | Wayne | NJ | 3 |
| de7045c96b | e88317d5a6 | Green Brook | UT | 2 |
| de7045c96b | 6ee1aec2ec | Red Hook | NJ | 1 |
| fd47c02c7d | 56e950fec9 | Red Hook | NY | 2 |

FIGURE 5

SYSTEMS AND METHODS FOR MANIPULATION OF PRIVATE INFORMATION ON UNTRUSTED ENVIRONMENTS

BACKGROUND OF THE INVENTION

1. Field Of The Invention

The present disclosure generally relates to systems and methods for manipulation of private information in untrusted environments.

2. Description Of The Related Art

Data that contains proprietary and confidential elements must be protected when taken out beyond the boundaries of a trusted domain managed by the data owner, due to laws and regulations of respective jurisdictions and data owner's fiduciary responsibilities. This normally involves encrypting data in transit and at rest while outside of the trusted domain in order to ensure data confidentiality, and calculating message authentication code for the data sets in order to ensure data integrity. This means that the data is unusable for processing by standard analytical tools when strong encryption methods are used for protection of data confidentiality and integrity.

As the result, in order to process confidential data outside of the trusted domain (e.g., on public clouds or in untrusted environments) the data must be either decrypted before processing, or lower strength encryption methods must be used, or processing becomes extremely slow. All of the above introduces vulnerabilities in data processing and negates benefits of using public infrastructures such as, but not limited to, public clouds.

SUMMARY OF THE INVENTION

Systems and methods for manipulation of private information in untrusted environments are disclosed. In one embodiment, in a trusted computing environment comprising at least one computer processor, for a plurality of data records, a method for manipulation of private information in untrusted environments may include: (1) separating each data record into a confidential data attribute and a non-confidential data attribute; (2) calculating an encrypted value for the confidential data attribute using an encryption key; (3) calculating an authentication value for the confidential data attribute, wherein the authentication value is a unsigned hash or a signed hash; (4) associating the encrypted value and the authentication value in a protected data set; and (5) associating the non-confidential data record with the associated encrypted value and the authentication value; and (6) exporting the protected data set to an untrusted computing environment.

In one embodiment, the confidential data attribute may include personal identifiable information.

In one embodiment, the encryption key may be used in a strong encryption algorithm. The strong encryption algorithm may be a AES/CBC algorithm or an AES/GCM algorithm.

In one embodiment, confidential data attributes having the same value have the same authentication value.

In one embodiment, the signed hash comprises a HMAC.

In one embodiment, the method may further include aggregating data in the protected data set based on the authentication values.

In one embodiment, the untrusted computing environment may include a public cloud, a private cloud, a hybrid cloud, or a third-party managed infrastructure.

In one embodiment, the method may further include executing a query against the authentication values in the protected data set; returning a responsive authentication value for the query; returning at least one encrypted value associated with the responsive authentication value to the trusted computing environment; and decrypting the at least one encrypted value resulting in the confidential data attribute for that at least one encrypted value.

According to another embodiment, a system for manipulation of private information in untrusted environments may include a trusted computing environment comprising a data set preparation engine, a data encryption key store, and an authenticator key store, and an untrusted computing environment comprising an analytical engine. The data encryption engine may receive a plurality of data records, and, for each data record, the data encryption engine may separate the data record into a confidential data attribute and a non-confidential data attribute, calculate an encrypted value for the confidential data attribute using an encryption key, calculate an authentication value for the confidential data attribute, wherein the authentication value is a unsigned hash or a signed hash, associate the encrypted value and the authentication value in a protected data set, and associate the non-confidential data record with the associated encrypted value and the authentication value. The data encryption engine may export the protected data set to the untrusted computing environment.

In one embodiment, the confidential data attribute may include personal identifiable information.

In one embodiment, the encryption key may be used in a strong encryption algorithm. The strong encryption algorithm may be a AES/CBC algorithm or an AES/GCM algorithm.

In one embodiment, confidential data attributes having the same value have the same authentication value.

In one embodiment, the signed hash may include a HMAC.

In one embodiment, the analytical engine may aggregate data in the protected data set based on the authentication values.

In one embodiment, the untrusted computing environment may include a public cloud, a private cloud, a hybrid cloud, or a third-party managed infrastructure.

In one embodiment, the analytical engine may execute a query against the authentication values in the protected data set; return a responsive authentication value for the query; and return at least one encrypted value associated with the responsive authentication value to the trusted computing environment. The data encryption engine may decrypt the at least one encrypted value resulting in the confidential data attribute for that at least one encrypted value.

Embodiments allow the use of strong cryptographic methods and ability to process data without the necessity of decrypting it.

In one embodiment, a data set preparation engine may include a data iterator; a data cypher; a data authentication code generator; an aggregator for element encryption and element authentication code for confidential elements; and a non-confidential element copier.

In embodiments, participants may include data producers and data consumers. In one embodiment, the unprotected data set constructed by producer may be converted to protected data set suitable for consumption by data consumers without removing the data protection.

In one embodiment, the protected data set confidential elements may be encrypted using strong encryption algorithms and authenticated to protect the confidential information.

In one embodiment, the protected data set may be manipulated and analyzed without necessity of decrypting the data.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts an example of an original data set in the trusted zone according to one embodiment;

DETAILED DESCRIPTION OF PREFERRED EMBODIMENTS

Embodiments are directed to systems and methods for manipulation of private information in untrusted environments.

In embodiments, a data record may include multiple data attributes. For example, a data record may include data attributes such as an individual's name, date of birth, address (e.g., street address, city, state, zip code), social security number, contact information (e.g., email address, phone number, etc.), demographic information, and any information about goods or services that may be provided to the individual (e.g., account types, account numbers, transactions, etc.). It should be recognized that these data records are exemplary only, and the actual data records may vary depending on the organization with which the data records are used, the goods/services provided by the organization, etc.

Some of the data attributes may include confidential, or personally identifiable information (PII). For example, the name, date of birth, social security number, contact information (e.g., email address, phone number, etc.), account numbers, etc. may include such confidential information, while others, such as certain parts of the address (e.g., city, state, zip code), account type, etc. may be non-confidential.

Embodiments include the creation of two data values from a single confidential data attribute. The first value is a one-way hashed value of the confidential data attribute, using, for example Keyed-Hashing for Message Authentication (HMAC), such as HMAC-SHA256. Other types of hashes may be used as is necessary and/or desired.

Because the same hash may be used on similar confidential data attributes, the hashed confidential data attributes will all have the same value. The hash, however, is irreversible, so the confidential data attributes cannot be recreated or recovered.

The second element is a non-deterministic encrypted value the confidential data attribute. For example, AES256 in Galois/Counter Mode (GCM) may be used. Other encryption methods may be used as is necessary and/or desired.

Embodiments may use a key management service (KMS) to secure the encryption key and/or the authentication key.

By de-identifying certain portions of the data attribute and using those as reference data, and using the hash and encrypted confidential data, analysis may be performed in the public cloud without compromising security.

Figure 1:
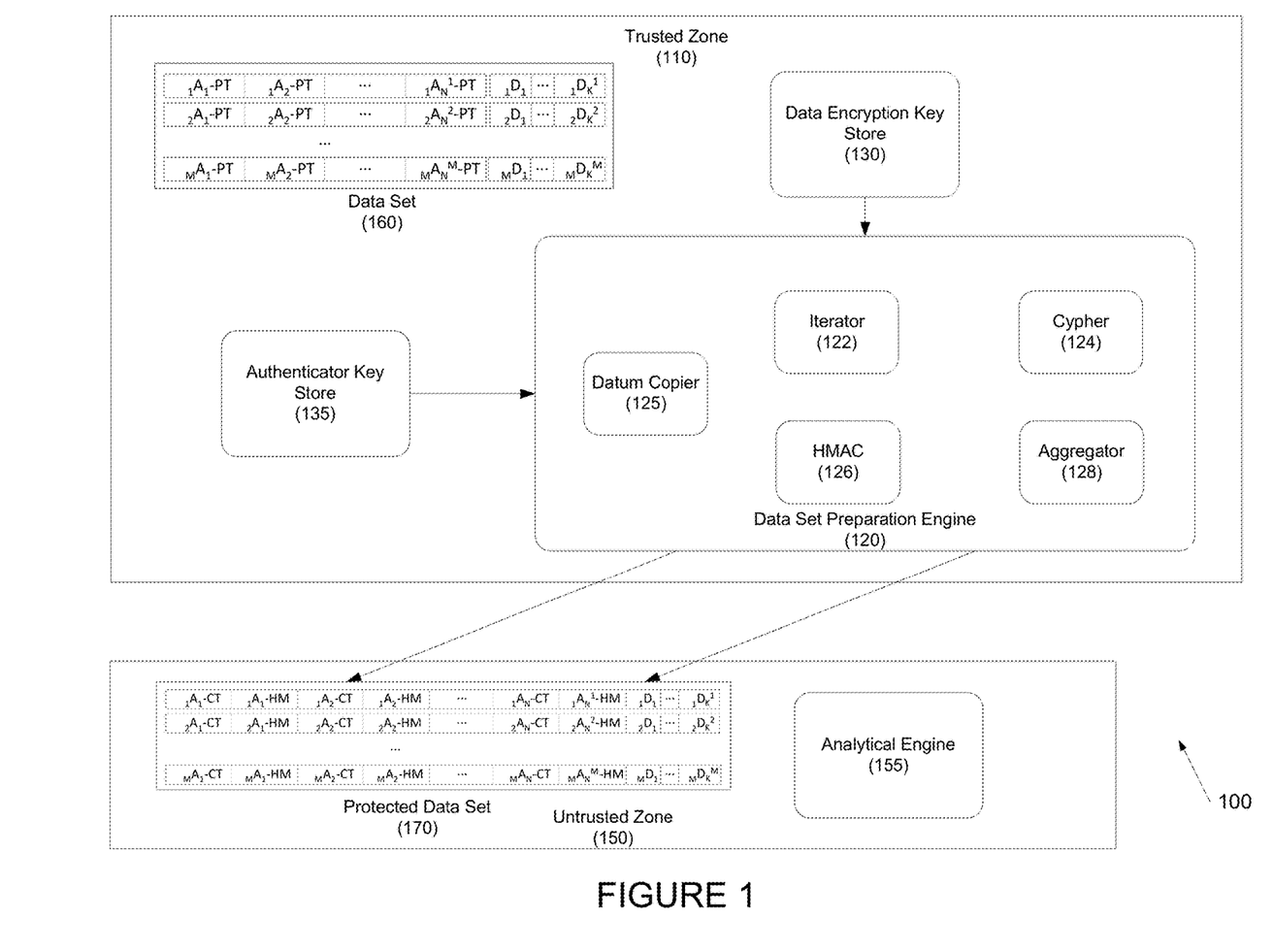
FIG. 1 depicts a system for manipulation of private information in untrusted environments according to one embodiment.

Referring to FIG. 1, a system for open manipulation of private information is disclosed according to one embodiment. System 100 may include trusted zone 110 and untrusted zone 150. Trusted zone 110 may include data set preparation engine 120 that implements protection of data set 160 by converting it into protected data set 170 and placing it in untrusted zone 150 for subsequent analysis.

Trusted zone 110 may further include authenticator key store 135 and data encryption key store 130.

Authenticator key store 135 may store and generate keys, such as HMAC keys.

Data encryption key store 130 may generate and store encryption keys that may be used to encrypt confidential data attributes.

Data set preparation engine 120 may be executed by a server (not shown) as a privacy program or application. In one embodiment, the server running may be any suitable electronic device, including servers, workstations, computers, cloud, etc. Data set preparation engine 120 may receive data set 160, may identify confidential data elements in the data records, and may hash and encrypt the confidential data elements.

Data set preparation engine 120 may include iterator 122, cypher 124, datum copier 125, HMAC 126, and aggregator 128. Iterator 122 may separate data elements from data set 160 into non-confidential data elements and confidential (e.g., PII) data elements.

Cypher 124 may calculate encrypted values of confidential data attributes. In one embodiment, the encryption algorithm used may be a strong encryption algorithm, and may include algorithms such as AES/CBC, AES/GCM, elliptic curve, etc.

Datum copier 125 may copy non-confidential data elements into protected data set 170.

HMAC 126 may calculate an authentication code for the confidential data attributes. In one embodiment, the authentication code may be signed; in another embodiment, the authentication code may be unsigned. The hashing algorithm used for producing the authentication code may be a strong algorithm, such as SHA-256, elliptic curve based algorithms, etc.

Aggregator 128 may combine the hash and encrypted values of the confidential data attributes and may place them into protected data set 170.

Data set 160 may be any suitable set of data records from any suitable data source (not shown). Each data record may include confidential and non-confidential data attributes. In one embodiment, data set 160 may be provided by a static data source, a streaming data source, etc.

Untrusted zone 150 may be any suitable storage, including off-premises cloud storage (e.g., AWS, Azure, etc.). In one embodiment, untrusted zone 150 may be a public cloud; in another embodiment, untrusted zone 150 may be a private cloud; in yet another embodiment, untrusted zone 150 may be an infrastructure hosted by another entity different from a public cloud. Untrusted zone 150 may also be a hybrid cloud if a need arises.

In one embodiment, untrusted zone may be provided with analytical engine 155. Analytical engine 155 may be implemented as an analysis program or an application, and may access and manipulate data (e.g., the reference data, hash, and/or encrypted data) in untrusted zone 150. In one embodiment, Analytical engine 155 may perform analysis and/or manipulation of the data, such as performing queries, etc. The results may be returned to a device (not shown) within trusted zone 110, where the encrypted data attributes may be decrypted.

Analytical engine 155 may execute on a cloud or any suitable electronic device, such as servers, desktop computers, notebook computers, laptop computers, tablet computes, terminals, smartphones, smart watches, Internet of Things (IoT) devices, etc.

In another embodiment, the electronic device that executes analytical engine 155 may be within trusted zone 150.

Figure 2:
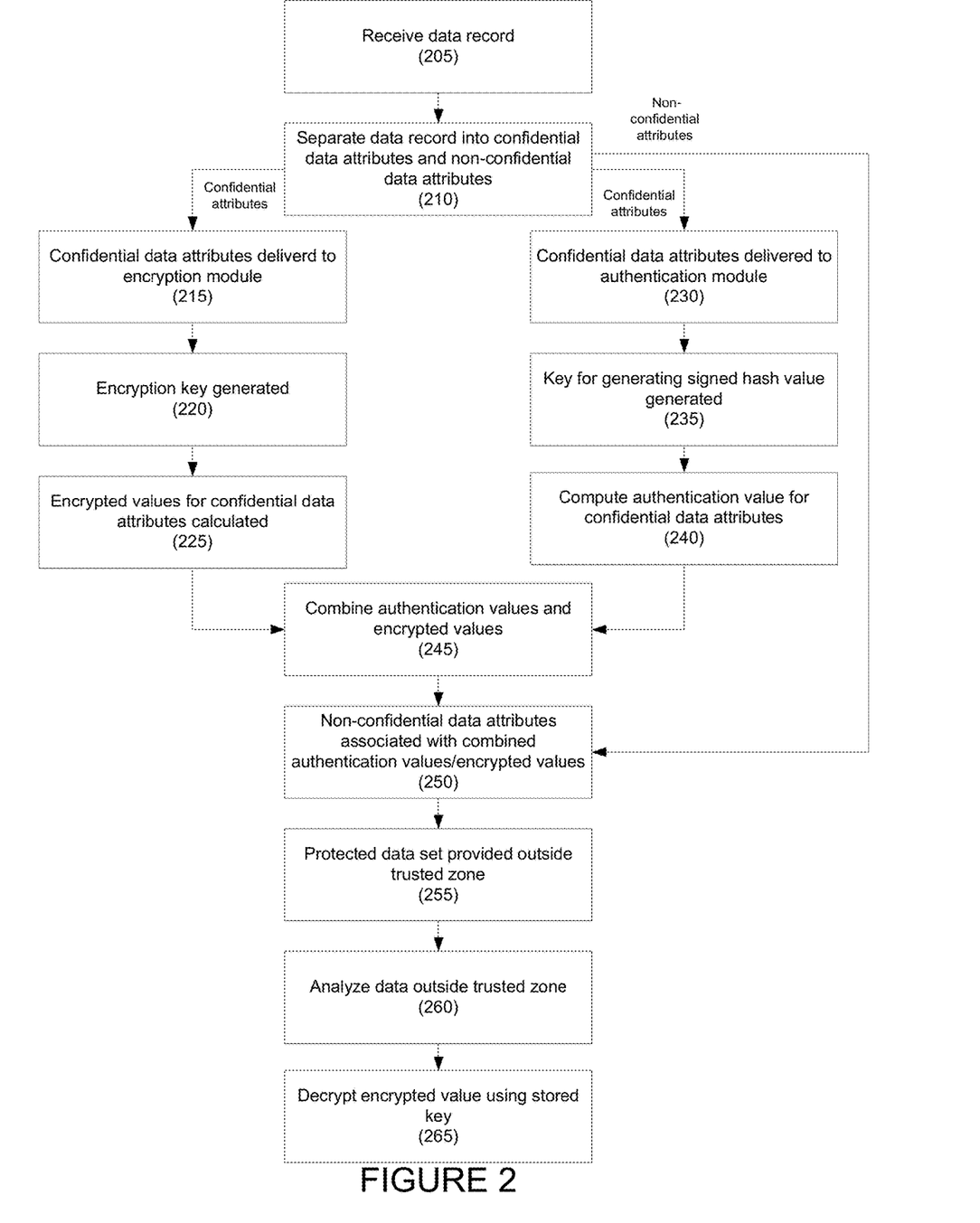
FIG. 2 depicts a method for manipulation of private information in untrusted environments according to one embodiment.

Referring to FIG. 2, a method for open manipulation of private information is disclosed according to one embodiment.

In step 205, a data record may be received. In one embodiment, the data record may be received, or retrieved, from a data source, such as a database that may store data having PII data.

In step 210, the data record may be separated into non-confidential data attributes and confidential (e.g., PII) data attributes.

In step 215, confidential data attributes may be delivered to an encryption module, such as a cypher module.

In step 220, an encryption key may be generated for encrypting the confidential data attributes. In another embodiment the encryption key may be stored for subsequent use. In yet another embodiment, the encryption key may be retrieved from the key store for use.

In step 225, encrypted values for the confidential data attributes may be calculated. The encryption used may be a strong encryption algorithm, including algorithms such as AES/CBC, AES/GCM, elliptic curve, etc.

In step 230, confidential data attributes may also be delivered to an authentication module.

In step 235, a key may be generated for generating a signed hash value for the confidential data attributes. In another embodiment, the encryption key may be stored for subsequent use. In yet another embodiment, the encryption key may be retrieved from the key store for use.

In step 240, the authentication value for confidential data attributes may be calculated. The authentication value may be signed or unsigned. The hashing algorithm used for producing the authentication code is a strong algorithm and may be but not limited to SHA-256 or elliptic curve based.

It should be noted that although steps 215-225 and 230-240 are illustrated as being in parallel, it should be noted that these steps may occur in any order as is necessary and/or desired. For example, these steps may be performed in parallel, sequentially, or in any combination thereof.

In step 245, the authentication values may be delivered for combination with other elements, such as the encrypted values. In one embodiment, the encrypted values and the authentication values may be combined using, for example, an aggregator.

In one embodiment, after they are combined, the combined encrypted value and authentication value for confidential data attributes may be provided as a protected data set.

In step 250, non-confidential attributes may be copied and may be associated with, combined with, or stored in the protected data set.

In step 255, the protected data set may be provided outside of the trusted zone to an untrusted zone, such as to a cloud, a third-party managed infrastructure, etc.

In step 260, the data outside the trusted zone may be analyzed. For example, data aggregation and/or other operations may be performed on the reference data, the hash value, and the encrypted value. For example, certain data may be considered to be "measures," as mathematical operations may be performed on this data, such as averaging, summation, comparison, ordering, etc.

Because all confidential data attributes may be hashed with the authentication key, groupings, aggregations, operations, etc. may be performed on the hash values without knowing what the hash values represent.

As a result of the analysis, a result set that include the reference data, the encrypted value, and any reference and/or measure data may be returned.

In step 265, the encrypted value(s) may be decrypted using the key stored in the key store.

Figure 4:
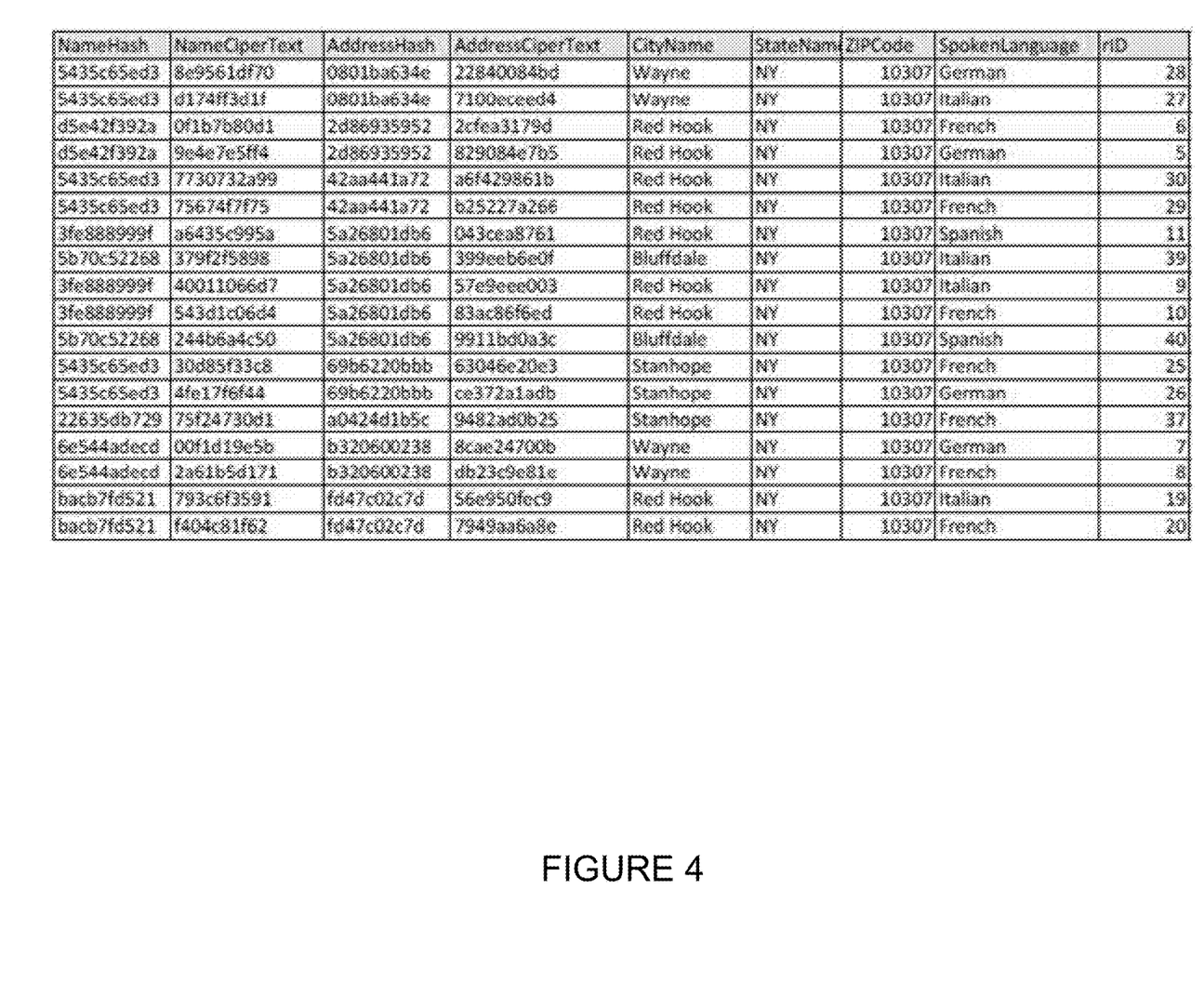
FIG. 4 depicts an example of a protected data set based on the original data set in FIG. 3 in the untrusted zone according to one embodiment.
Figure 5:
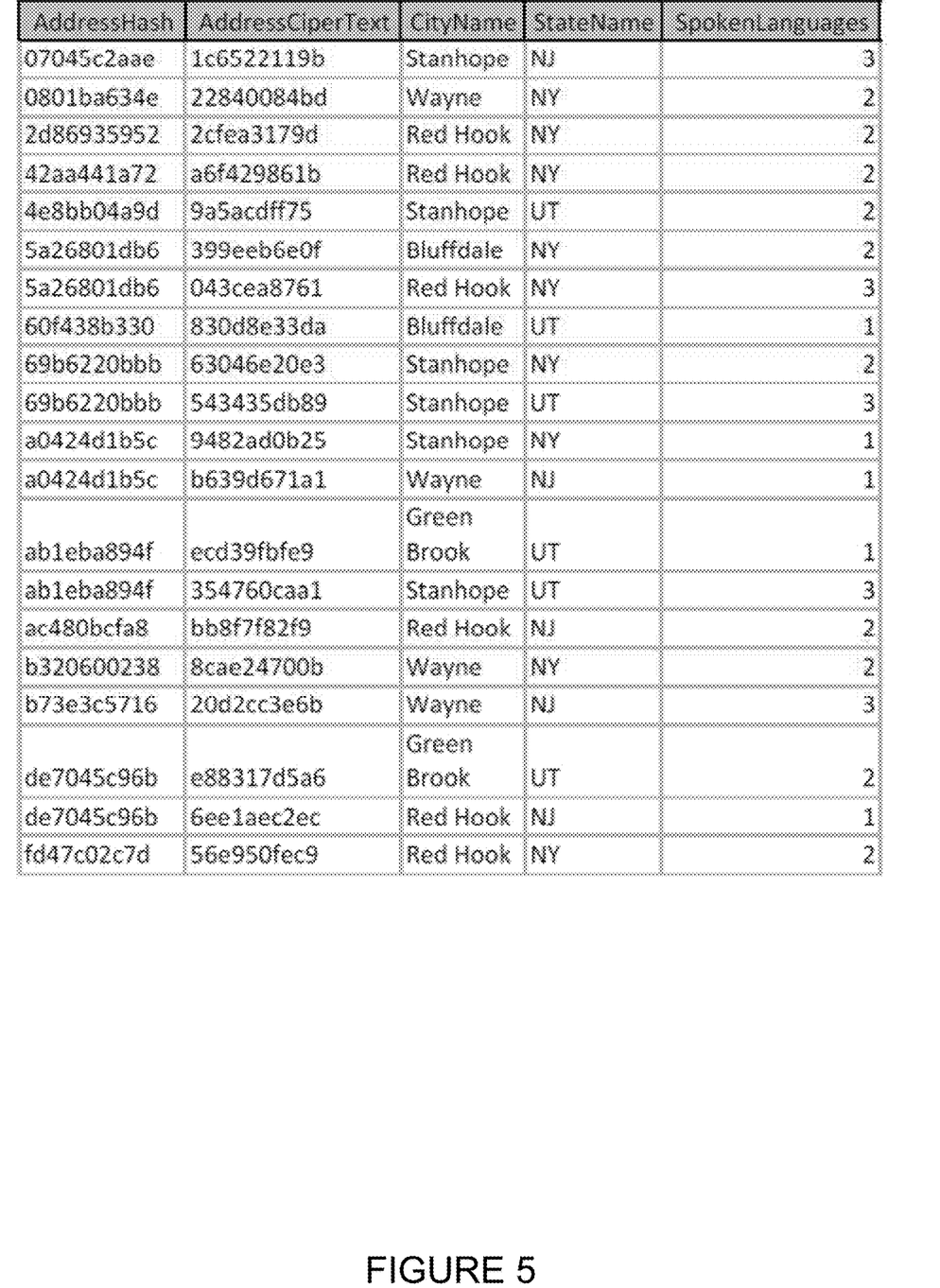
FIG. 5 depicts an example of a result of a query performed on the protected data set in the untrusted zone according to one embodiment, without using unprotected private data.

The following non-limiting example of FIGS. 3-5 is provided for illustrative purposes only. It should be noted that some of the authentication and encrypted values provided have been simplified for inclusion in this application, and may not reflect actual authentication or encrypted values. For example, the authentication and encrypted values are represented as fewer digits or characters than would be used to simplify the presentation of this example, and are not actual authentication or encrypted values for the underlying data.

FIG. 3 depicts an exemplary illustration of an original data set according to one embodiment. The example shows confidential attributes, such as Name and AddrName, and non-confidential attributes such as CityName, StateName, ZIPCode, and Spoken Language. In one embodiment, this data set may reside in the clear in a trusted zone.

FIG. 4 depicts an exemplary illustration of a resulting protected data set according to one embodiment. The protected data set is obtained by processing the original data set using, for example, HMAC-SHA256 authentication and AES/GCM encryption methods. For example, the confidential data attributes Name and Address have both had an authentication value (i.e., NameHash and AddressHash) and encrypted value (i.e., NameCipherText and AddressCipherText) generated, while the non-confidential data attributes CityName, StateName, ZIPCode, and SpokenLanguage, have not.

FIG. 5 illustrates an exemplary subset of the resulting protected data set disclosed on FIG. 4.

The "ID" provides a linkage of lines between the exemplary illustrations of the original data set disclosed in FIG. 3, the protected result set of FIG. 4, and the extract from the protected result set disclosed in FIG. 5

FIG. 5 provides an exemplary illustration of an answer to the question "how many languages each household can speak" according to one embodiment. The question "how many languages each household can speak" may translate into the statement select AddrHash, min(AddrCiperText), CityName, StateName, count(SpokenLanguages) as Languages group by select AddrHash, CityName, StateName.

For example, a question such as "What is the household in the state of New York with largest number of spoken languages?" can be answered by analyzing the resulting data set from the exemplary illustrations depicted in FIGS. 4 and 5. In this example, the reference element of spoken language may be converted into measures, such as the number of spoken languages, and compared to each other.

From the exemplary illustration disclosed on FIG. 5 it can be observed that the household in NY state with the highest number of spoken languages belongs to the household with an authentication value (e.g., AddressHash) of 5a26801db6, and address encrypted value (e.g., AddressCipherText) of 043cea8761. By decrypting this value, it can be seen that the household's address is 396 Heights Dr, Red Hook, N.Y., 10307.

As can be seen from FIG. 4, one person lives in this household, since the authentication value for the name (e.g., NameHash) is the same (3fe888999f), and the address authentication value (e.g., AddressHash) for 5a26801db6 identifies the city Red Hook, N.Y.

There are three different encrypted name values for the authentication value for the name (e.g., NameHash): a6435c995a, 40011066d7, and 543d1c06d4. Decrypting any of the associated encryption values (e.g., NameCipher) results in the name of Helen Smith, who lives at 396 Heights Dr, Red Hook, N.Y., 10307 and speaks Italian, French, and Spanish. This information may be obtained from the protected set disclosed on FIG. 4 only, without necessity of consulting the original set disclosed on FIG. 3.

It should be recognized that the embodiments disclosed herein are not exclusive to each other; features and elements from one embodiment may be used with others as is necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, Python, Rust, C#, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software, for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for manipulation of private information in untrusted environments comprising:
in a trusted environment comprising at least one computer processor, for a plurality of data records:
separating, by a data set preparation engine, each data record of an unprotected data set into a confidential data attribute and a non-confidential data attribute;
calculating, by the data set preparation engine, an encrypted value for the confidential data attribute using an encryption key;

calculating, by the data set preparation engine, an authentication value for the confidential data attribute, wherein the authentication value is one from among an unsigned hash and a signed hash;

associating, by the data set preparation engine, the encrypted value with the authentication value in a protected data set;

aggregating data in the protected data set based on the authentication values;

associating the non-confidential data record with the associated encrypted value and the authentication value;

wherein the unprotected data set comprises a table of the confidential and non-confidential attributes, and includes
- a single unprotected name column whose rows include different names,
- first and second unprotected partial address columns, each unprotected partial address column providing a different part of a complete address for each name in the name column, and
- an unprotected additional attribute column providing an additional attribute for each name in the name column, wherein the protected data set comprises a table of the confidential and non-confidential attributes including
- two protected name columns corresponding to the single unprotected name column and including
  - an authentication name column providing an authentication value for each name in the name column of the unprotected data set, and
  - an encrypted value name column providing an encryption value for each name in the name column of the unprotected data set, and
- two protected partial address columns corresponding to the first unprotected partial address column and including
  - an authentication partial address column providing an authentication value for each partial address in the first unprotected partial address column, and
  - an encrypted value partial address column providing an encryption value for each partial address in the first unprotected partial address column, and
- an unprotected additional attribute column providing the same unprotected additional attribute for each name as in the unprotected data set; and exporting the protected data set to an untrusted computing environment, wherein the additional attribute is the spoken language of people whose names appear in the single unprotected name column in the unprotected data set, and is the spoken language of people whose authentication values and encrypted values appear in the two protected name columns in the protected data set.

2. The method of claim 1, wherein the confidential data attribute comprises personal identifiable information.

3. The method of claim 1, wherein the encryption key is used in a strong encryption algorithm.

4. The method of claim 3, wherein the encryption key is used in an Advanced Encryption Standard/Galois Counter Mode (AES/GCM) algorithm.

5. The method of claim 1, wherein the signed hash is a Keyed-Hashing for Message Authentication (HMAC) value.

6. The method of claim 1, wherein the untrusted computing environment comprises one from among a public cloud, a private cloud, a hybrid cloud, and a third-party managed infrastructure.

7. The method of claim 1, further comprising:
executing a query against the authentication values in the protected data set;
returning a responsive authentication value for the query;
returning at least one encrypted value associated with the responsive authentication value to the trusted computing environment; and
decrypting the at least one encrypted value resulting in the confidential data attribute for that at least one encrypted value.

8. The method of claim 1, wherein
the first unprotected partial address column is a column whose rows contain the name of the street and the street number of the complete address for each name in the unprotected name column.

9. A system for manipulation of private information in untrusted environments comprising:
a trusted environment, comprising at least one processor, and further comprising a data set preparation engine, a data encryption key store, and an authenticator key store; and
an untrusted computing environment comprising an analytical engine;
wherein:
the data set preparation engine receives a plurality of data records; and
for each data record, the data set preparation engine:
separates the data record of an unprotected data set into a confidential data attribute and a non-confidential data attribute;
calculates an encrypted value for the confidential data attribute using an encryption algorithm;
calculates an authentication value for the confidential data attribute, wherein the authentication value is one from among an unsigned hash and a signed hash;
associates the encrypted value with the authentication value in a protected data set;
aggregates data in the protected data set based on the authentication values;
associates the non-confidential data record with the associated encrypted value and the authentication value;
wherein the unprotected data set comprises a table of the confidential and non-confidential attributes, and includes
a single unprotected name column whose rows include different names,
first and second unprotected partial address columns, each unprotected partial address column providing a different part of a complete address for each name in the name column, and
an unprotected additional attribute column providing an additional attribute for each name in the name column,
wherein the protected data set comprises a table of the confidential and non-confidential attributes including
two protected name columns corresponding to the single unprotected name column and including an authentication name column providing an authentication value for each name in the name column of the unprotected data set, and an encrypted value name column providing an encryption value for each name in the name column of the unprotected data set, and two protected partial address columns corresponding to the first unprotected partial address column and including an authentication partial address column providing an authentication value for each partial address in the first unprotected partial address column, and an encrypted value partial address column providing an encryption value for each partial address in the first unprotected partial address column, and an additional attribute column providing the same unprotected additional attribute for each name as in the unprotected data set; and exports the protected data set to the untrusted computing environment, wherein the additional attribute is the spoken language of people whose names appear in the single unprotected name column in the unprotected data set, and is the spoken language of people whose authentication values and encrypted values appear in the two protected name columns in the protected data set.

10. The system of claim 9, wherein the confidential data attribute comprises personal identifiable information.

11. The system of claim 9, wherein the encryption key is used in a strong encryption algorithm.

12. The system of claim 11, wherein the encryption key is used in an Advanced Encryption Standard/Galois Counter Mode (AES/GCM) algorithm.

13. The system of claim 9, wherein the signed hash is a Keyed-Hashing for Message Authentication (HMAC) value.

14. The system of claim 9, wherein the untrusted computing environment comprises one from among a public cloud, a private cloud, a hybrid cloud, and a third-party managed infrastructure.

15. The system of claim 9, wherein the analytical engine:

executes a query against the authentication values in the protected data set;

returns a responsive authentication value for the query;

returns at least one encrypted value associated with the responsive authentication value to the trusted computing environment; and the data set preparation engine decrypts the at least one encrypted value resulting in the confidential data attribute for that at least one encrypted value.

* * * * *